(12) United States Patent
Kim et al.

(10) Patent No.: US 12,456,501 B2
(45) Date of Patent: Oct. 28, 2025

(54) ADDRESS DECODING METHOD, AND MEMORY CONTROLLER AND SEMICONDUCTOR MEMORY SYSTEM USING THE SAME

(71) Applicant: SAMSUNG ELECTRONICS CO., LTD., Suwon-si (KR)

(72) Inventors: Chinam Kim, Suwon-si (KR); Tae-Kyeong Ko, Suwon-si (KR); Cholmin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/209,057

(22) Filed: Jun. 13, 2023

(65) Prior Publication Data

US 2024/0177746 A1 May 30, 2024

(30) Foreign Application Priority Data

Nov. 30, 2022 (KR) .......................... 10-2022-0164892

(51) Int. Cl.
*G11C 7/10* (2006.01)
(52) U.S. Cl.
CPC .......... *G11C 7/1039* (2013.01); *G11C 7/1069* (2013.01); *G11C 7/1096* (2013.01)
(58) Field of Classification Search
CPC .................................................. G11C 7/1039
See application file for complete search history.

(56) References Cited

U.S. PATENT DOCUMENTS

| | | | |
|---|---|---|---|
| 6,715,025 B2 | 3/2004 | Kanno et al. | |
| 6,985,483 B2 | 1/2006 | Mehrotra et al. | |
| 7,213,099 B2 | 5/2007 | Kuo et al. | |
| 9,934,143 B2 | 4/2018 | Bains et al. | |
| 10,489,083 B2 | 11/2019 | Bains et al. | |
| 11,068,183 B2 | 7/2021 | Qawami et al. | |
| 2004/0006671 A1* | 1/2004 | Handgen | G06F 12/0862 711/137 |
| 2013/0275699 A1 | 10/2013 | Cheriton | |
| 2017/0153825 A1 | 6/2017 | Cho et al. | |
| 2018/0052787 A1 | 2/2018 | Son et al. | |
| 2021/0374055 A1* | 12/2021 | Aga | G06F 12/0646 |
| 2022/0350525 A1* | 11/2022 | Dongaonkar | G11C 7/1015 |

OTHER PUBLICATIONS

Communication dated Mar. 20, 2024, issued by European Patent Office in European Patent Application No. 23199513.5.

\* cited by examiner

*Primary Examiner* — Hoai V Ho
(74) *Attorney, Agent, or Firm* — Sughrue Mion, PLLC

(57) ABSTRACT

A semiconductor memory system includes a memory device including plural banks, and a memory controller that generates an offset address for a first bank among the plural banks and a command indicating the offset address, based on a first request. The memory device generates a first address by adding the offset address to a base address for the first bank, according to the command, and performs a memory operation on the first address of the first bank according to the command.

17 Claims, 11 Drawing Sheets

ADDRESS DECODING METHOD, AND MEMORY CONTROLLER AND SEMICONDUCTOR MEMORY SYSTEM USING THE SAME

CROSS-REFERENCE TO RELATED APPLICATION

This application claims priority to Korean Patent Application No. 10-2022-0164892 filed in the Korean Intellectual Property Office on Nov. 30, 2022, the entire contents of which are incorporated herein by reference.

BACKGROUND

The disclosure relates to an address decoding method, and a memory controller and a semiconductor memory system using the same.

A bandwidth and an operating frequency of a semiconductor memory device are continuously increasing. With the increase in operating frequency, standby power proportional to the operating frequency is also increasing. There is a need for a technology capable of reducing standby power for use in a semiconductor memory device.

SUMMARY

It is an aspect to provide a technology related to a semiconductor memory device that can be driven with low power by reducing standby power.

According to an aspect of one or more embodiments, there is provided a semiconductor memory system comprising a memory device comprising a plurality of banks; and a memory controller configured to generate an offset address for a first bank among the plurality of banks and a command indicating the offset address, based on a first request, wherein the memory device is configured to generate a first address by adding the offset address to a base address for the first bank, according to the command, and perform a memory operation on the first address of the first bank according to the command.

According to another aspect of one or more embodiments, there is provided a memory controller comprising a plurality of bank queues corresponding respectively to a plurality of banks of a memory device, each of the plurality of bank queues storing a plurality of requests; and a plurality of bank schedulers respectively corresponding to the plurality of bank queues, each of the plurality of bank schedulers scheduling a processing order for the plurality of requests in a corresponding one of the plurality of bank queues, wherein when a difference between an address corresponding to a current request from a last address for a memory area that was driven last in a corresponding bank of the plurality of banks is within an offset range, each of the plurality of bank schedulers generates an offset address according to the difference.

According to yet another aspect of one or more embodiments, there is provided a address decoding method comprising decoding a command; when the command indicates an address comprises an offset row address, generating a row address by adding the offset row address to a base row address for a memory row that was driven last in a bank corresponding to the address; and when the command indicates the address comprises an offset column address, generating a column address by adding the offset column address to a base column address for a memory column that was driven last in a bank corresponding to the address.

DETAILED DESCRIPTION

Figure 1:
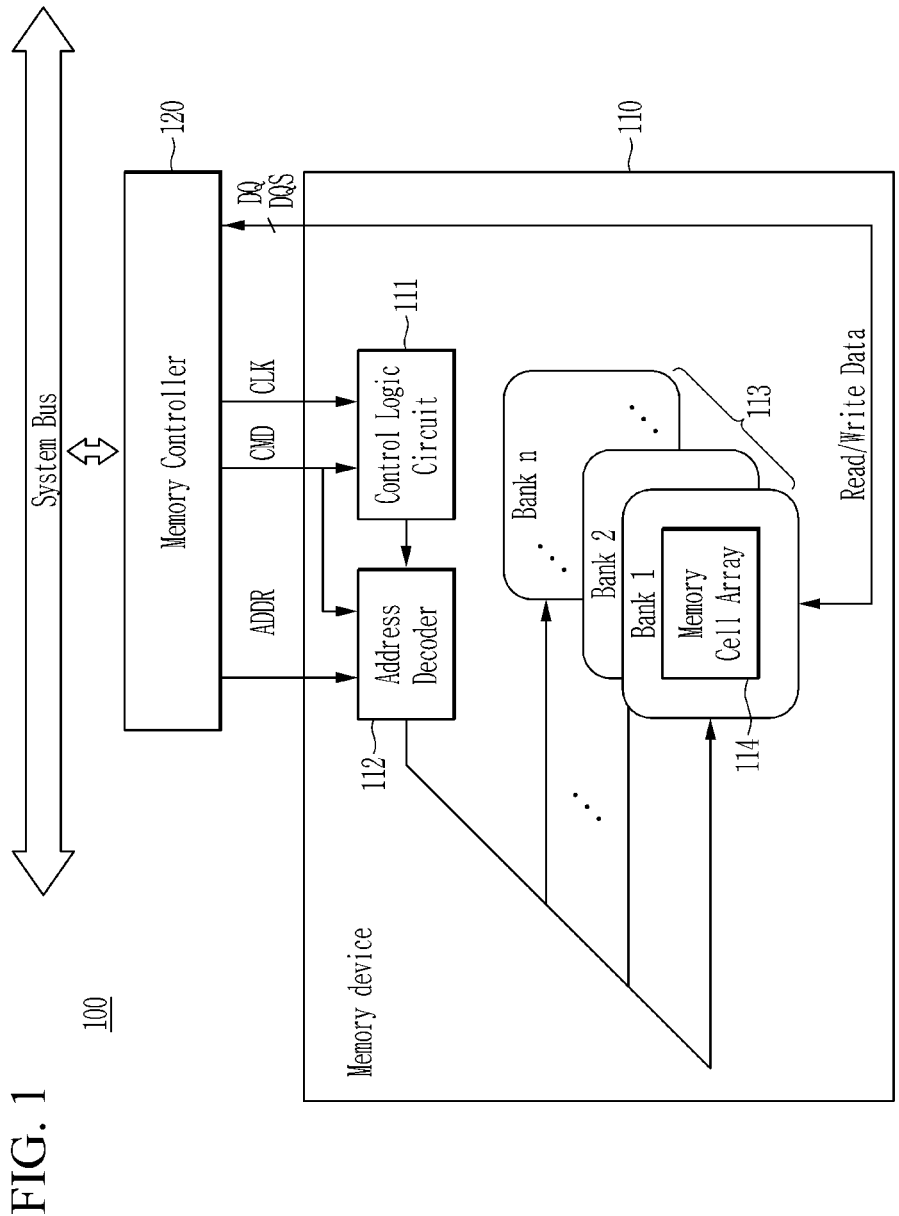
FIG. 1 is an exemplary block diagram of a semiconductor memory system according to some embodiments.

Hereinafter, various embodiments will be described in detail with reference to the accompanying drawings, so that those skilled in the art can easily carry out the various embodiments. However, the present disclosure may be embodied in various different forms, and is not limited to the various embodiments set forth herein.

In addition, parts irrelevant to the description are omitted in the drawings in order to clearly describe the various embodiments, and like reference signs are attached to like parts throughout the specification. In a flowchart described with reference to the drawings, the order of the operations may be changed, several operations may be merged, a certain operation may be divided, and/or a specific operation may not be performed.

In addition, expressions described in the singular form may be interpreted as being singular or plural unless explicit expressions such as "one" or "single" are used. Terms comprising ordinal numbers such as "first" and "second" may be used to describe various elements, but the elements are not limited by these terms. These terms may be only used to distinguish one element from another element. In other words, the terms "first" and "second" do not suggest any order, but merely are used to distinguish one element from another. Additionally, as used in this specification, the phrase "at least one of A and B" includes within its scope "only A", "only B" and "A and B".

FIG. 1 is an exemplary block diagram of a semiconductor memory system according to some embodiments.

Referring to FIG. 1, a semiconductor memory system 100 comprises a memory device 110 and a memory controller 120. The memory device may be a semiconductor memory device.

The memory controller 120 may access the memory device 110 according to a request transmitted through a bus between the memory controller 120 and the memory device 110. It is noted that the bus between the memory controller 120 and the memory device 110 is different than the system bus labeled in FIG. 1 and described below. A data signal DQ and a data strobe signal DQS may be transmitted and received through the bus between the memory device 110 and the memory controller 120, and a command CMD, an address ADDR, and a clock CLK may be transmitted from the memory controller 120 to the memory device 110.

The memory device 110 comprises a control logic circuit 111, an address decoder 112, and a plurality of banks 113 (also referred to as Bank 1, Bank 2, to Bank n where appropriate). Each of the plurality of banks 113 may comprise a memory cell array 114. The memory cell array 114 may comprise a plurality of memory cells connected to a plurality of rows and a plurality of columns. In some exemplary embodiments, the rows may be defined by word lines, and the columns may be defined by bit lines.

When the address received from the memory controller 120 is an offset address, the address decoder 112 may generate a full address based on a last address and the offset address. The address ADDR may comprise one of a row address and a column address along with a bank address. The offset address may refer to a difference of an address (row or column) of a memory area to be driven at a current time from a base address for a bank indicated by the address ADDR. The base address may be set to an address (row or column) of a memory area last driven in the bank. The offset address may be one of an offset row address, an offset column address, or a combination of an offset row address and an offset column address. The full address generated by the address decoder 112 may be one of a row address, a column address, or a combination of a row address and a column address in the bank indicated by the address ADDR. The memory area may comprise at least one memory cell.

The address decoder 112 may obtain information regarding whether the address ADDR is an offset address or a full address by decoding the command CMD. The address decoder 112 may comprise an address table that stores information regarding a row and a column last driven for each of the plurality of banks 113 as a base address. In other words, the address table may store, for each of the plurality of banks 113, a base row address that was last driven for the bank and a base column address that was last driven for the bank.

Although it is illustrated in FIG. 1 that the control logic circuit 111 and the address decoder 112 are separated, in some embodiments, the address decoder 112 may be implemented as one component of the control logic circuit 111. For example, the memory device 110 may further comprise an address buffer, and when the address received in the address buffer is an offset address, the control logic circuit 111 may generate a full address by adding a last address to the address received in the address buffer.

The memory controller 120 may receive a plurality of requests from one or more processors and I/O devices through a system bus, and write data to the memory device 110 through the bus in response to each of the plurality of requests, or transmit data read from the memory device 110 through the bus. The memory controller 120 may convert each of the plurality of requests to a first address in accordance with an address mapping policy, schedule each of the plurality of requests to a corresponding bank among the plurality of banks in accordance with a predetermined rule, and generate one or more commands CMD for each of the plurality of requests. When the first address corresponding to a current request for each bank is within an offset range with respect to a second address corresponding to a last request immediately before the current request, the memory controller 120 may generate an offset address corresponding to the first address with respect to the second address (offset addressing mode). Otherwise, the memory controller 120 may use the first address as is (full addressing mode).

The memory controller 120 may generate an offset address for a certain request and generate a command CMD instructing a memory operation according to the offset address. The memory controller 120 may schedule a plurality of commands CMD corresponding to the plurality of banks, and provide each of the plurality of commands CMD and an address ADDR corresponding thereto to the memory device 110 according to the scheduling. The command CMD may indicate whether the address ADDR is a full address or an offset address. In the following description, the "address" or the "full address" refers to an address for a memory area in a certain bank defined in the full addressing mode, the "full row address" or the "row address" refers to an address of a memory row in the full addressing mode, and the "full column address" or the "column address" refers to an address of a memory column in the full addressing mode. The "offset address" refers to an address for a memory area in a certain bank defined in the offset addressing mode, the "offset row address" refers to an address of a memory row in the offset addressing mode, and the "offset column address" refers to an address of a memory column in the offset addressing mode.

According to the command CMD and the address ADDR, the memory device 110 may access a memory cell array 114 of a corresponding one of the plurality of banks 113, and perform a memory operation such as a read operation or a write operation. The memory device 110 may generate clock signals based on the clock signal CLK and control read and write operations using the generated clock signals. During the read operation, data read from the memory cell arrays 114 of the plurality of banks 113 may be implemented as a data signal DQ, and the data signal DQ may be transmitted to the memory controller 120. During the write operation, the data signal DQ transmitted from the memory controller 120 may be written to the memory cell arrays 114 as data. A data strobe signal DQS for controlling the read and write operations may be provided from the memory controller 120 to the memory device 110.

The command CMD may comprise an activate command, a read/write command, a refresh command, or the like. In some exemplary embodiments, the activate command may be a command for switching a target row of a memory cell array 114 of a particular bank of the plurality of banks 113 to an active state to write data to the memory cell array 114 or to read data from the memory cell array 114. In response to the activate command, memory cells in the target row may be activated (for example, driven). The read/write command may be a command for performing a read or write operation on the target memory cells in the row switched to the active state.

The memory device 110 may be a storage device based on a semiconductor device. In some embodiments, the memory device 110 may comprise a dynamic random access memory (DRAM), a double data rate 4 (DDR4), a synchronous DRAM (SDRAM), a low power DDR4 (LPDDR4), an SDRAM, an LPDDR5 SDRAM, or the like. In some embodiments, the memory device 110 may comprise a non-volatile memory device such as NAND or 3D vertical NAND.

Figure 2:
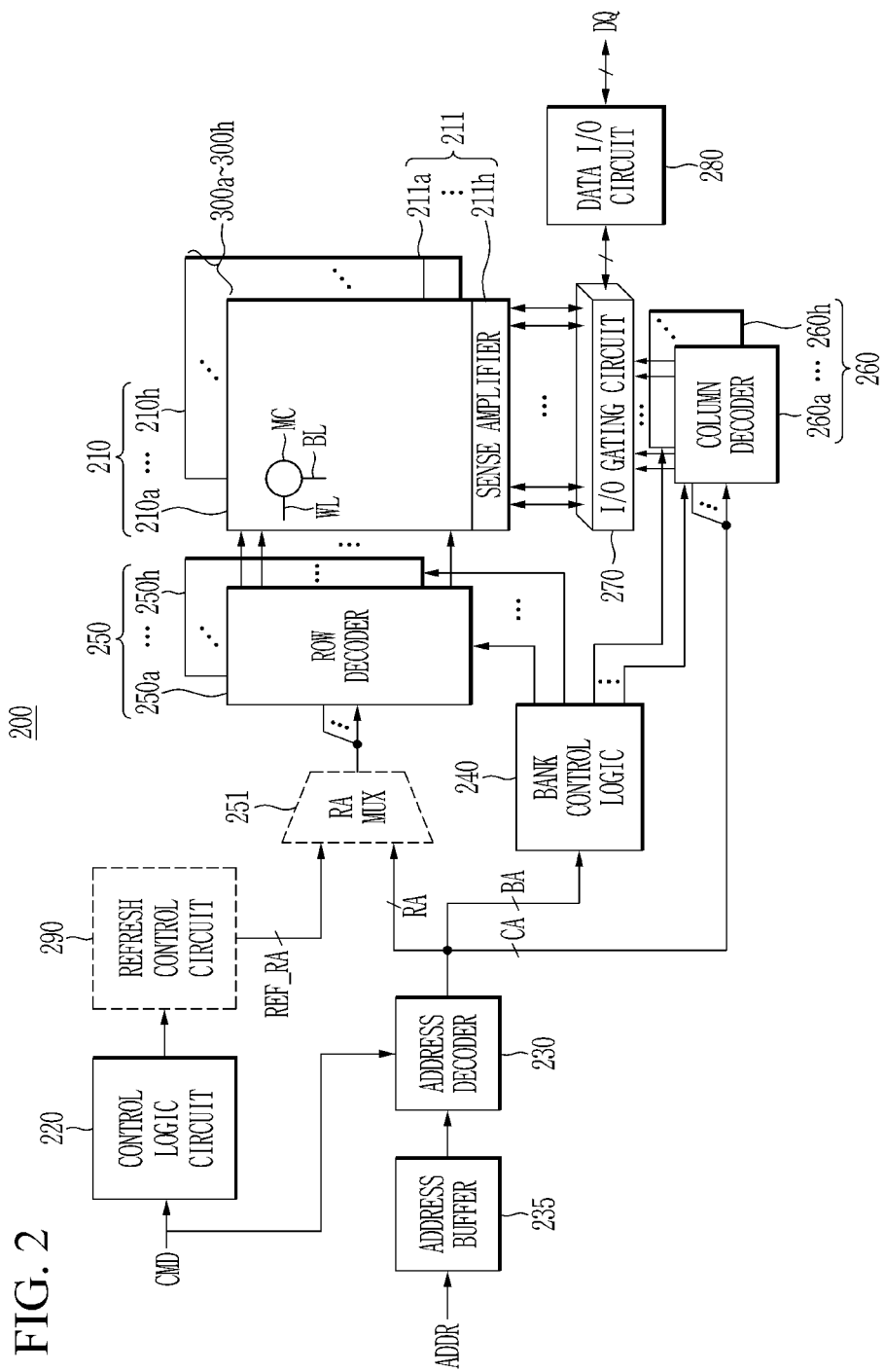
FIG. 2 is a block diagram illustrating a semiconductor memory device according to some embodiments.

FIG. 2 is a block diagram illustrating a semiconductor memory device according to some embodiments.

Referring to FIG. 2, a memory device 200 comprises a plurality of memory cell arrays 210, a plurality of sense amplifiers 211, a control logic circuit 220, an address decoder 230, an address buffer 235, a bank control logic 240, a plurality of row decoders 250, a plurality of column decoders 260, an input/output (I/O) gating circuit 270, and data input/output (I/O) circuit 280. In some embodiments, the memory device 200 may correspond to the memory device 110 in FIG. 1.

Each of the plurality of memory cell arrays 210 comprises a plurality of memory cells MC. Each of the plurality of memory cell arrays 210 may comprise a plurality of rows, a plurality of columns, and a plurality of memory areas where the plurality of rows and the plurality of columns intersect each other. Each of the plurality of memory areas may comprise at least one memory cell MC. In the memory cell array 210 according to some exemplary embodiments, each of the plurality of rows may be defined by each of a plurality of word lines WL, and each of the plurality of columns may be defined by at least one corresponding bit line BL.

The control logic circuit 220 controls an operation of the memory device 200. For example, the control logic circuit 220 may generate a control signal so that the memory device 200 performs a read operation, a write operation, a ZQ calibration operation, or the like. In some embodiments, the control logic circuit 220 may generate a control signal by decoding a command CMD.

The address buffer 235 may receive and store an address ADDR provided from the memory controller 120. Although it is illustrated in FIG. 2 that the address buffer 235 is a component separate from the address decoder 230, but the invention is not limited thereto. The address buffer 235 may be implemented inside the address decoder 230. The address ADDR may be a row address indicating a certain row in the memory cell array 210 or a column address indicating at least two columns in the memory cell array 210. The column address may be defined in units of bit lines BL corresponding to a plurality of columns on the basis of a unit of a data bus. For example, in a semiconductor memory system having a 4-bit data bus, a column address may be defined in units of four bit lines. Hereinafter, the memory row may be defined as a word line, and the memory column may be defined in units of bit lines corresponding to the number of bits of the data bus.

The address decoder 230 may receive a command CMD from the memory controller 120. The address decoder 230 may determine whether the address ADDR provided from the memory controller 120 to the memory device 110 is an offset address or a full address for a certain bank by decoding the command CMD. Specifically, the address decoder 230 may identify which one the address ADDR is among a full row address, a full column address, an offset row address, and an offset column address for a certain bank by decoding the command CMD. In some embodiments, the control logic circuit 220 may identify which one the address ADDR received from the memory controller 120 is among a full row address, a full column address, an offset row address, and an offset column address for a certain bank by decoding the command CMD, and provide information indicating an identification result to the address decoder 230. In the following disclosure, it will be assumed that the address decoder 230 identifies the type of address ADDR by decoding the command CMD.

When the command CMD indicates an offset row address, the address ADDR is an offset row address for a certain bank and may indicate a difference of a memory row to be driven this time from a memory row that was driven last (i.e., immediately prior) in the certain bank. The address decoder 230 may generate a row address RA, which is a full address, based on the offset row address stored in the address buffer 235 and the last row address of the certain bank.

When the command CMD indicates an offset column address, the address ADDR is an offset column address for a certain bank, and may indicate a difference of a memory column to be driven this time from a memory column that was driven last (i.e., immediate prior) in the certain bank. The address decoder 230 may generate a column address CA, which is a full address, based on the offset column address stored in the address buffer 235 and the last column address of the bank. When the command CMD indicates a full address, the address decoder 230 may output a row address RA or a column address CA which is an address ADDR stored in the address buffer 235 as is.

The address decoder 230 may provide the row address RA to a row address multiplexer 251, and provide the column address CA to a column decoder 260.

In some embodiments, the memory controller 120 may provide a bank address indicating a bank corresponding to the address ADDR among the plurality of banks to the memory device 200, and the address decoder 230 may provide the bank address BA to the bank control logic 240.

According to the bank address BA, the bank control logic 240 may activate a row decoder 250 corresponding to the bank address BA among the plurality of row decoders 250, and activate a column decoder 260 corresponding to the bank address BA among the plurality of column decoders 260. In some embodiments, a plurality of row decoders 250a to 250h and a plurality of column decoders 260a to 260h corresponding to the plurality of memory cell arrays 210a to 210h may be provided. In some embodiments, a bank may comprise a memory cell array and a row decoder and a column decoder driving the memory cell array. The plurality of banks 300 may comprise eight banks 300a to 300h. The bank 300a may comprise a memory cell array 210a, a row decoder 250a, and a column decoder 260a, . . . , and the bank 300h may comprise a memory cell array 210h, a row decoder 250h, and a column decoder 260h.

In some embodiments, the memory device 200 may further comprise a row address multiplexer 251 and a refresh control circuit 290, and the refresh control circuit 290 may sequentially output row addresses REF_RA to be refreshed under the control of the control logic circuit 220. The row address multiplexer 251 may receive a row address RA from the address decoder 230 and a row address REF_RA to be refreshed from the refresh control circuit 290. The row address multiplexer 251 may selectively output the row address RA received from the address decoder 230 and the row address REF_RA received from the refresh control circuit 290 to the row decoder 250.

The row decoder 250 selects a row to be activated from among the plurality of rows of the memory cell array 210 based on the row address in the bank indicated by the bank address BA. To this end, the row decoder 250 may apply a driving voltage to a word line corresponding to the row to be activated.

The column decoder 260 selects a column to be activated from among the plurality of columns of the memory cell array 210 based on the column address in the bank indicated by the bank address BA. To this end, the column decoder 260 may activate a sense amplifier 211 corresponding to the column address CA through the I/O gating circuit 270.

In some embodiments, the I/O gating circuit 270 may gate input and output data, and may comprise a data latch for storing data read from the memory cell array 210 and a write driver for writing data to the memory cell array 210. The data read from the memory cell array 210 may be sensed by the sense amplifier 211 and stored in the I/O gating circuit 270 (e.g., data latch). In some exemplary embodiments, a plurality of sense amplifiers 211a to 211h corresponding to the plurality of memory banks 300a to 300h, respectively, may be provided.

In some embodiments, the data (e.g., data stored in the data latch) read from the memory cell array 210 may be provided to the memory controller 120 through the data I/O circuit 280. The data to be written to the memory cell array 210 may be provided to the data I/O circuit 280 from the memory controller 120, and the data provided to the data I/O circuit 280 may be provided to the I/O gating circuit 270.

The data I/O circuit 280 may generate a clock signal using a data strobe signal DQS received from the memory controller 120 through the bus, convert the data input to the data I/O circuit 280 among data stored in the memory cell array 210 into a data signal DQ according to the clock signal, and provide the data signal DQ to the memory controller 120. The data I/O circuit 280 may generate a clock signal using the data strobe signal DQS received from the memory controller 120 through the bus, and generate data to be written to the memory cell array 210 by sampling and amplifying the data signal DQ provided from the memory controller 120.

In the following description, the offset address may indicate at least one of an offset row address and an offset column address, and the full address may indicate at least one of a full row address and a full column address.

Figure 3:
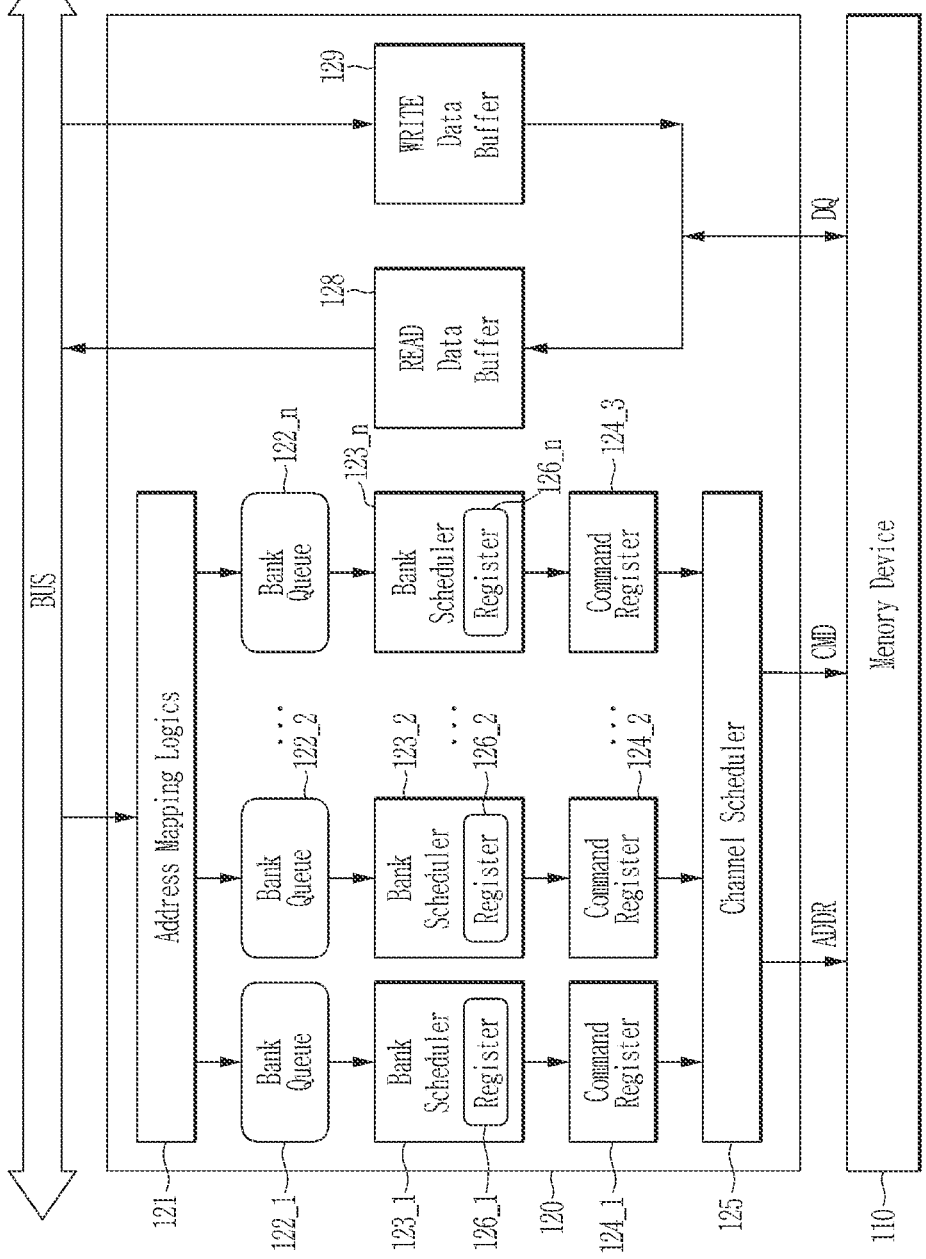
FIG. 3 is a block diagram illustrating a memory controller according to some embodiments.

FIG. 3 is a block diagram illustrating a memory controller according to some embodiments.

The memory controller 120 may comprise an address mapping logic 121, a plurality of bank queues 122_1 to 122_n, a plurality of bank schedulers 123_1 to 123_n, a plurality of command registers 124_1 to 124_n, and a channel scheduler 125.

The address mapping logic 121 may convert each of a plurality of requests into an address in accordance with an address mapping policy. The address mapping policy may be implemented as, for example, interleaved banks or private banks, etc., or as a combination of two or more address mapping policies. The address mapping logic 121 may assign each of the plurality of requests to a corresponding one of the plurality of bank schedulers 123_1 to 123_n in accordance with a rule established in consideration of a timing constraint defined in a specific protocol such as JEDEC and efficiency in processing the requests, and queue each of the requests in a bank queue (one of the bank queues 122_1 to 122_n) corresponding to a bank defined by an address corresponding to the request. The number of the plurality of bank queues 122_1 to 122_n may be equal to the number of the plurality of banks (BANK1 to BANKn) constituting the memory device 110.

Each of the plurality of bank schedulers 123_1 to 123_n may schedule a processing order for a plurality of requests stored in a corresponding bank queue (one of the bank queues 122_1 to 122_n), and generate the plurality of requests as a plurality of commands according to the scheduling order. Each of the plurality of bank schedulers 123_1 to 123_n may compare an address corresponding to a current request according to the scheduling order with a last address of a memory area last driven in a corresponding bank. When the difference between the two addresses is within a set offset range, each of the plurality of bank schedulers 123_1 to 123_n may generate an offset address according to the difference between the address corresponding to the current request and the last address. Each of the plurality of bank schedulers 123_1 to 123_n may update the address corresponding to the current request as a last address. When an address corresponding to a certain request is generated as an offset address, each of the plurality of bank schedulers 123_1 to 123_n may generate a command indicating the offset address for the request. A command using a full address and a command using an offset address may be distinguished from each other by command delimiters. The command delimiter may comprises codes that define corresponding commands that indicate the memory operations of the memory device 110. The codes can be implemented by using various signals provided from the memory controller 120 to the memory device 110. When the difference between the two addresses is not within the set offset range, each of the plurality of bank schedulers 123_1 to 123_n may generate the address corresponding to the current request as a full address. Each of the plurality of bank schedulers 123_1 to 123_n may provide the address and command generated as described above to each of the plurality of command registers 124_1 to 124_n.

Each of the plurality of bank schedulers 123_1 to 123_n may determine a processing order for a plurality of requests in accordance with the set policy. The set policy may comprise an open page method considering a row hit or the like. In some embodiments, in addition to the preset policy, each of the plurality of bank schedulers 123_1 to 123_n may determine a processing order for a plurality of requests queued in a corresponding bank queue, depending on whether an address for each of the requests can be generated as an offset address. For example, each of the plurality of bank schedulers 123_1 to 123_n may give a priority to a request for which an address ADDR can be provided as an offset address to the memory device 110 over a request for which an address ADDR can be provided as a full address to the memory device 110. Then, the request corresponding to the full address may be changed to a request corresponding to an offset address. In some embodiments, in the case of a buffer miss in which there is no active memory row corresponding to a current request in a bank, when a difference between an address of a memory row that was last active and an address corresponding to a current request in each bank is within a predetermined offset range, each of the plurality of bank schedulers 123_1 to 123_n may give a priority to the current request over the other requests in a corresponding bank queue, and generate the difference between the address for the current request and the address of the memory row that was last active as an offset address.

The channel scheduler 125 may monitor a plurality of commands for the plurality of banks stored in the plurality of command registers 124_1 to 124_n, select a command CMD having a highest priority among all commands satisfying required channel real-time constraint conditions, and transmit the selected command CMD together with the address ADDR to the memory device 110. The channel scheduler 125 may select a command CMD having a highest priority among the plurality of commands stored in the plurality of command registers 124_1 to 124_n, and transmit the selected command CMD together with the address ADDR to the memory device 110. In this case, the address ADDR may comprise an offset address together with the bank address, or may comprise a full address together with the bank address.

In this way, the memory controller 120 may determine an access sequence for a plurality of received requests through bank scheduling and channel scheduling, and provide commands CMD and addresses ADDR to the memory device 200 according to the determined access sequence.

The plurality of bank schedulers 123_1 to 123_n may comprise registers 126_1 to 126_n each storing a last address of a memory area driven last in a corresponding bank. The channel scheduler 125 may transmit, to a bank scheduler (one of the bank schedulers 123_1 to 123_n) corresponding to the command CMD and the address ADDR transmitted to the memory device 110, a command processing signal notifying that the command has been processed. For example, the channel scheduler 125 may transmit a command processing signal to a bank scheduler 123_i (where i is one of integers from 1 to n), and the bank scheduler 123_i may record an address corresponding to the command processed by the channel scheduler 125 in a last address register 126_i. At this time, the address may be a full address. That is, the bank scheduler 123_i receiving the command processing signal from the channel scheduler 125 among the plurality of bank schedulers 123_1 to 123_n may store the full address corresponding to the processed command in the last address register 126_i.

The memory controller 120 may further comprise a read data buffer 128 and a write data buffer 129. The read data buffer 128 may store read data provided from the memory device 110, and provide the read data to the bus in response to an external request. The write data buffer 129 stores write data provided through the bus, and may provide the write data to the memory device 110 in response to an external request.

Hereinafter, an address decoder will be described with reference to FIG. 4.

Figure 4:
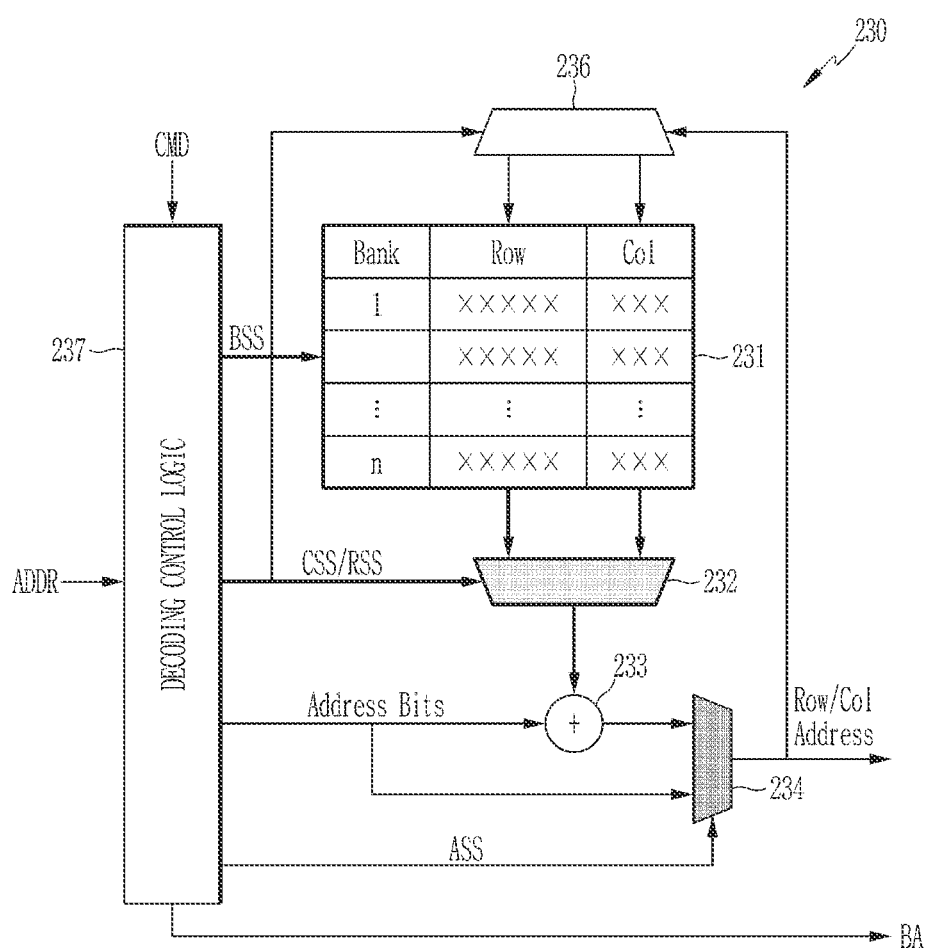
FIG. 4 is a block diagram illustrating an address decoder according to some embodiments.

FIG. 4 is a block diagram illustrating an address decoder according to some embodiments.

As illustrated in FIG. 4, an address decoder 230 may comprise an address table 231, a row/column selector 232, an address summer 233, an address multiplexer (MUX) 234, an address demultiplexer (DEMUX) 236, and a decoding control logic 237.

The decoding control logic 237 may receive an address ADDR and a command CMD, identify whether the address ADDR is an offset address or a full address by decoding the command CMD, and generate an address select signal ASS for controlling the address MUX 234 based on an identification result. The decoding control logic 237 may derive a bank address BA from the address ADDR. The decoding control logic 237 may provide the bank address BA to the bank control logic 240.

The decoding control logic 237 may derive address bits indicating a row address or a column address from the address ADDR. Each of an offset row address and an offset column address may be implemented with data comprising a set number Na of consecutive bits, and each of a full row address and a full column address may also be implemented with data comprising a set number Nb of consecutive bits. Nb may be a natural number greater than Na.

When the address ADDR is a full address, the decoding control logic 237 may generate an address select signal ASS giving an instruction to output a row address or a column address indicated by the address ADDR as it is. When the address ADDR is an offset row address, the decoding control logic 237 may generate an address select signal ASS giving an instruction to output a row address or a column address provided from the address summer 233. The decoding control logic 237 may provide an address select signal ASS to the address MUX 234. The address MUX 234 may provide the row address or the column address indicated by the address ADDR to the row address multiplexer 251 or the plurality of column decoders 260 according to the address select signal ASS. In some embodiments, the MUX 234 may provide the row address or the column address provided from the address summer 233 to the row address multiplexer 251 or the plurality of column decoders 260.

When the address ADDR is an offset row address, the decoding control logic 237 may generate a bank select signal BSS according to the bank address BA, and generate a row select signal RSS for controlling a row address summing operation of the address summer 233. When the address ADDR is an offset column address, the decoding control logic 237 may generate a bank select signal BSS according to bank address BA, and generate a column select signal CSS for controlling a column address summing operation of the address summer 233.

The offset row address and the offset column address, or the row address and the column address provided by the decoding control logic 237 to the address summer 233 and the address MUX 234 may be collectively defined as address bits.

The address table 231 may store, for each of the plurality of banks 300a to 300h, a row address (hereinafter referred to as a base row address) and a column address (hereinafter referred to as a base column address) for an address (hereinafter referred to as a base address) of a memory area that was driven last in the bank. As illustrated in FIG. 4, the address table 231 comprises a "Bank" column, a "Row" column, and a "Col" column, and a bank address, a base row address, and a base column address are recorded in the respective columns of each row of the address table 231. One of the plurality of banks 1, 2, . . . , or n in the "Bank" column of the address table 231 may be selected according to a bank select signal BSS generated by the decoding control logic 237.

The row/column selector 232 may provide, to the address summer 233, a base row address and a base column address of the bank selected according to the row select signal RSS and column select signal CSS generated by the decoding control logic 237. The row/column selector 232 may provide the base row address to the address summer 233 in synchronization with the row select signal RSS, and may provide the base column address to the address summer 233 in synchronization with the column select signal CSS.

In this way, the decoding control logic 237 may select a certain bank from the address table 231, control a timing at which a base row address of the selected bank is provided to the address summer 233, and control a timing at which a base column address of the selected bank is provided to the address summer 233.

When address bits are provided to the address summer 233, the row/column selector 232 may provide a base row address or a base column address to the address summer 233 in accordance with an offset row address or an offset column address indicated by the address bits.

The address summer 233 may generate a row address RA by adding the address bits to the base row address, or generate a column address CA by adding the address bits to the basic column address.

The address MUX 234 may output a row address RA or a column address CA corresponding to the address bits according to the address select signal ASS, or output a row address RA or a column address CA generated by the address summer 233. For example, when the command CMD indicates a full address, the address MUX 234 may output one of the row address RA and the column address CA according to the address ADDR in response to the address select signal ASS provided by the decoding control logic 237. When the command CMD indicates an offset address, the address MUX 234 may output the row address or the column address generated by the address summer 233 according to the address select signal ASS provided by the decoding control logic 237.

The address DEMUX 236 may update the row address or the column address output through the address MUX 234 in a bank (Bank) indicated by the bank select signal BSS and a row (Row) or a column (Col) of the bank (Bank) indicated by the row select signal RSS or the column select signal CSS in the address table 231.

Hereinafter, a method of generating a full address by decoding a command CMD and an address ADDR by a semiconductor memory device according to some embodiments will be described.

Figure 5:
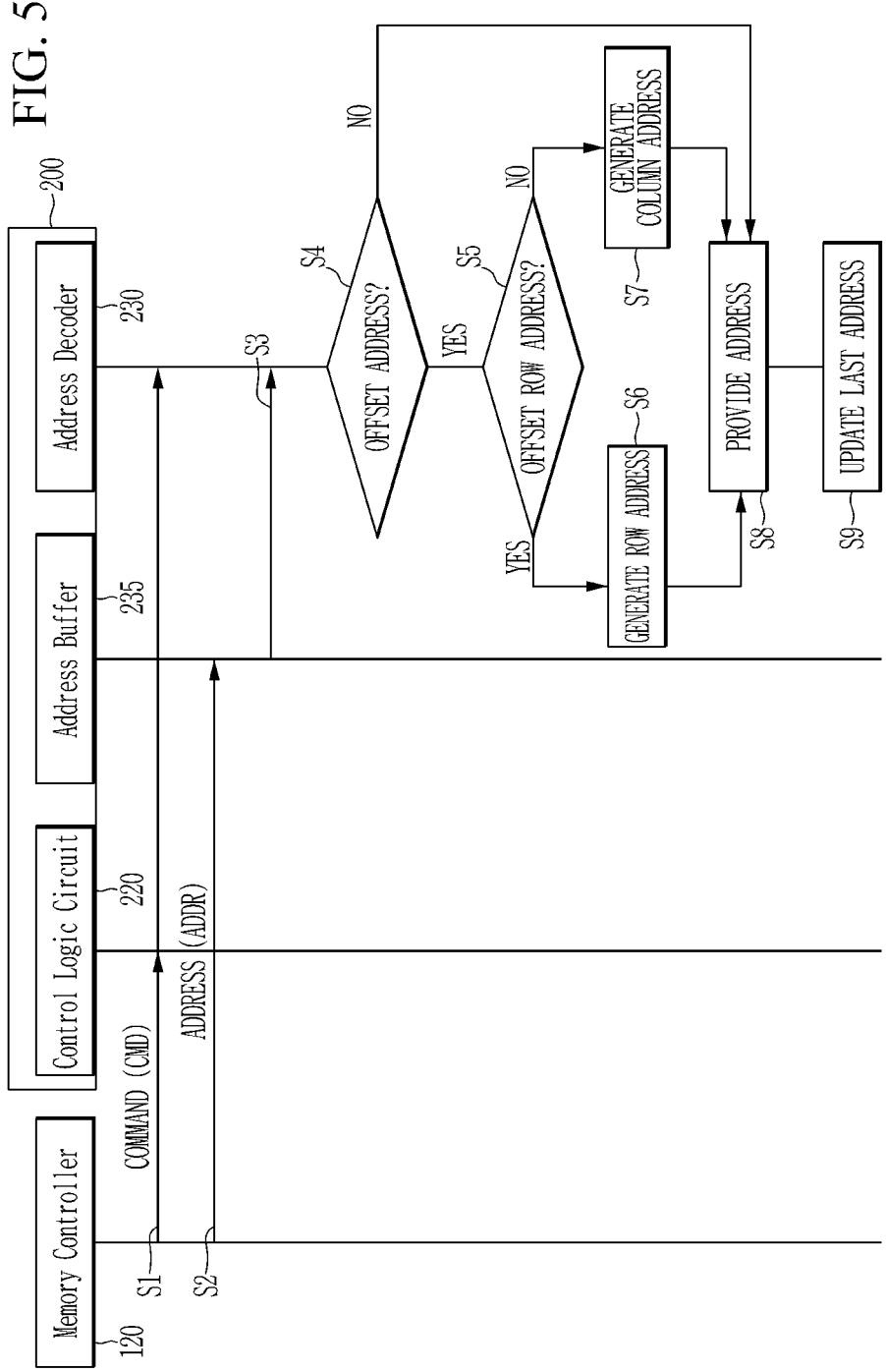
FIG. 5 is a flowchart illustrating an address decoding method of a memory device according to some embodiments.

FIG. 5 is a flowchart illustrating an address decoding method of a memory device according to some embodiments.

The memory controller 120 may provide a command CMD and an address ADDR to the memory device 200 (S1 and S2, respectively). Accordingly, the control logic circuit 220 and the address decoder 230 of the memory device 200 may acquire the command CMD, and the address buffer 235 of the memory device 200 may acquire the address ADDR.

The address buffer 235 may provide the address ADDR to the address decoder 230 (S3).

The address decoder 230 may determine whether the address ADDR is an offset address (S4). For example, the address decoder 230 may determine whether the address ADDR is the offset address by decoding the command CMD.

As a result of the determination in S4, when the address ADDR is a full address and not an offset address (S4, NO), a row address or a column address indicated by the address ADDR may be provided (S8). For example, the row address or the column address indicated by the address ADDR may be provided to the row address multiplexer 251 or the plurality of column decoders 260.

As a result of the determination in S4, when the address ADDR is an offset address (S4, YES), the address decoder 230 may determine whether the address ADDR comprises an offset row address (S5).

As a result of the determination in S5, when the address ADDR comprises an offset row address (S5, YES), the address decoder 230 may generate a row address (S6). For example, the address decoder 230 may select a bank from the address table 231 according to a bank select signal BSS, read a base row address from the selected bank, and add address bits indicating the offset row address to the base row address to generate the row address.

As a result of the determination in S5, when the address ADDR comprises an offset column address and not an offset row address (S5, NO), the address decoder 230 may generate a column address (S7). For example, the address decoder 230 may select a bank from the address table 231 according to a bank select signal BSS, read a base column address from the selected bank, and add address bits indicating the offset column address to the base column address to generate the column address.

After the step S6 or S7, step S8 may be performed. The generated row address or the generated column address may be provided (S8) as discussed above.

After the step S8, the address decoder 230 may update the last address (S9). For example, the address decoder 230 may update the row address or the column address generated in the step S6 or S7 in a corresponding bank (Bank) and row (Row) or column (Col) of the address table 231. The address table 231 may store the updated row addresses or column addresses.

Concerning a plurality of requests to the memory device 200 for a read operation or a write operation, when a plurality of addresses corresponding to the plurality of requests change in accordance with a certain rule or are adjacent to each other, the memory controller 120 may generate an offset address. For example, in some embodiments, when a chip implementing an artificial neural network reads data from the semiconductor memory system for vector processing and writes processing results into the semiconductor memory system, a plurality of addresses corresponding to a plurality of requests may follow a predetermined rule. In some embodiments, when a video encoding chip reads an image source from the semiconductor memory system, a plurality of addresses corresponding to a plurality of requests may follow a predetermined rule. According to some embodiments, in an environment where predictable accesses to the semiconductor memory system are predominant as described above, it may be efficient to transmit an offset address, rather than a full address, to the memory device in driving the memory device.

Figure 6:
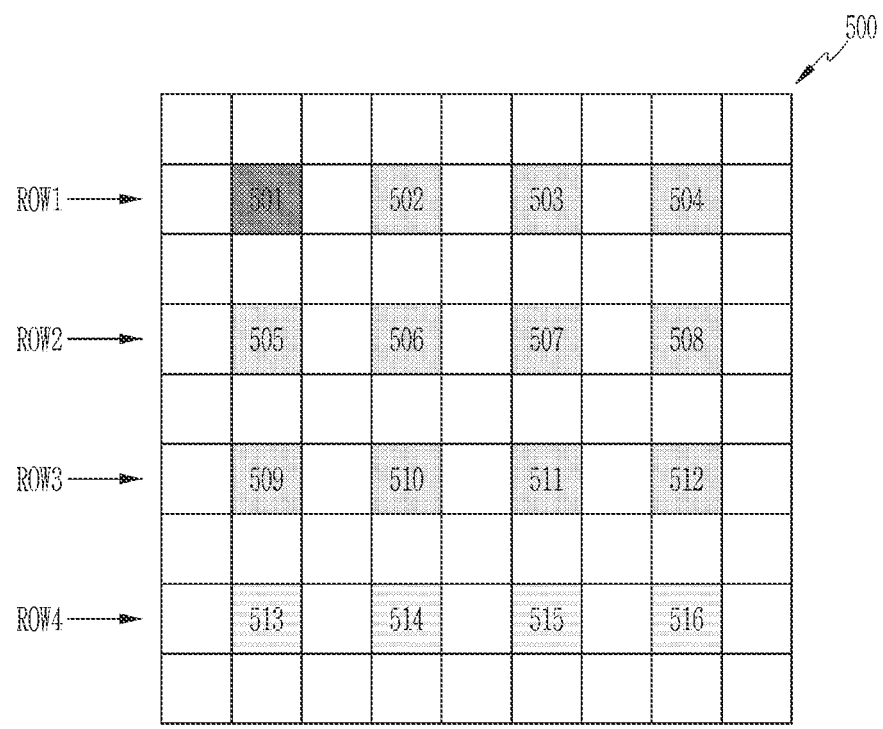
FIG. 6 is a diagram schematically illustrating a partial portion of a memory cell array of a certain bank among a plurality of banks according to some embodiments.

FIG. 6 is a diagram schematically illustrating a partial portion of a memory cell array of a certain bank among a plurality of banks according to some embodiments.

As illustrated in FIG. 6, it is assumed that a plurality of read requests or a plurality of write requests to memory areas are generated in an order according to a stride pattern in a memory cell array 500. As illustrated in FIG. 6, a plurality of memory areas 501 to 516 are located at regular intervals in the memory cell array 500. Specifically, the plurality of memory areas 501 to 516 may be spaced apart from each other in units of 2×2 in the memory cell array 500, and each of the plurality of memory areas 501 to 516 may be defined by a row address and a column address, and may comprise at least one memory cell.

In the related art, a memory controller needs to transmit a plurality of addresses implemented as full addresses for a plurality of memory areas, respectively, to a memory device according to a scheduling order. For example, in a case where a plurality of memory areas 501 to 504 located to be spaced apart from each other in units of two columns in a row ROW1 are driven in the right direction, the memory controller needs to transmit a full address of the memory area 501, and then transmit column addresses having a predetermined number of bits to the memory device three times consecutively. In the same way, when a plurality of memory areas 505 to 508, 509 to 512, and 513 to 516 located to be spaced apart from each other in units of two columns in a plurality of rows ROW2, ROW3, and ROW4, respectively, are driven in the right direction, the memory controller needs to transmit a full address of each of the memory areas 505, 509, and 513, and then transmit column addresses having a predetermined number of bits to the memory device three times consecutively.

By contrast, according to some embodiments, when an offset address is used, the memory controller 120 only needs to transmit a full address of the memory area 501, and then transmit an offset column address between the memory area 501 and the memory area 502, an offset column address between the memory area 502 and the memory area 503, and an offset column address between the memory area 503 and the memory area 504 to the memory device 110. In this case, the offset column addresses may be implemented with a smaller number of bits than the predetermined number of bits as in the memory controller of the related art. Subsequently, the memory controller 120 only needs to transfer an offset row address and an offset column address between the memory area 504 and the memory area 505 to the memory device 110, and then transmit an offset column address between the memory area 505 and the memory area 506, an offset column address between the memory area 506 and the memory area 507, and an offset column address between the memory area 507 and the memory area 508 to the memory device 110. In this way, according to some embodiments, the memory controller 120 may transmit an offset address comprising a smaller number of bits than a full address to the memory device 110.

Since the memory controller 120 generates an offset address according to a difference between a last address and a current address, the generated offset address may be variable. In some embodiments, the memory controller 120 may fix an offset address under specific conditions. The specific conditions may be defined by design. For example, in some embodiments, when a host providing an image source to a display uses a semiconductor memory system as a frame buffer, a one frame-based image source to be displayed on a screen for each frame may be located in a predetermined pattern in a memory device. In this case, the offset address may be a fixed value. According to some embodiments, the memory controller 120 may selectively provide one of a command comprising a generated offset address and a command with a fixed offset address to the memory device 200.

Table 1 is a table showing variable offset-based commands that may change whenever an offset address is generated.

TABLE 1

| Operation of memory device | Components |
|---|---|
| Offset-Activate | command delimiter, bank address, offset |
| Offset-Read | command delimiter, bank address, offset, whether to perform auto-precharge |
| Offset-Write | command delimiter, bank address, offset, whether to perform auto-precharge |

In Table 1, the command "Offset-Activate" is a command indicating an activate operation using an offset address, and may comprise a command delimiter, a bank address, and an offset. The "activate operation" may refer to an operation of selecting one of a plurality of banks and activating one of a plurality of memory rows constituting the selected bank. The offset comprised in the command "Offset-Activate" may be an offset row address. The command "Offset-Read" is a command indicating a read operation using an offset address, and may comprise a command delimiter, a bank address, an offset, and whether to perform auto-precharge. The "read operation" may refer to an operation of selecting a specific memory column from the activated bank and memory row and reading data therefrom. The command "Offset-Write" is a command indicating a write operation using an offset address, and may comprise a command delimiter, a bank address, an offset, and whether to perform auto-precharge. The "write operation" may refer to an operation of selecting a specific memory column from the activated bank and memory row and writing data thereto. The offsets of the command "Offset-Read" and the command "Offset-write" may be offset column addresses. The auto-precharge may refer to a command for performing a precharge operation after performing a read or write operation during a predetermined operation period. Table 2 is a table showing fixed offset-based commands with fixed offset addresses.

TABLE 2

| Operation of memory device | Components |
|---|---|
| Offset-Activate | command delimiter, bank address |
| Offset-Read | command delimiter, bank address, whether to perform auto-precharge |
| Offset-Write | command delimiter, bank address, whether to perform auto-precharge |
| Set-Offset | command delimiter, bank address, offset |

In Table 2, the command "Offset-Activate" is a command indicating an activate operation using an offset address, and may comprise a command delimiter and a bank address. The command "Offset-Read" is a command indicating a read operation using an offset address, and may comprise a command delimiter, a bank address, and whether to perform auto-precharge. The command "Offset-Write" is a command indicating a write operation using an offset address, and may comprise a command delimiter, a bank address, and whether to perform auto-precharge. The command "Set-Offset" may comprise a command delimiter, a bank address, and an offset having a fixed value. The offset of the command "Set-Offset" may be an offset address corresponding to the command, that is, an offset row address, an offset column address, or a combination of an offset row address and an offset column address. As can be seen from Tables 1 and 2, according to some embodiments, a plurality of command delimiters for distinguishing a plurality of commands that are newly created from each other have been added to a plurality of existing command delimiters. In order to combine the plurality of newly created delimiters, pins may be added to the memory device 110. In some embodiments, information may be added to a signal transmitted to one of the pins provided in the memory device 110, and the memory device 110 may perform a decoding operation to obtain the additional information.

Figure 7:
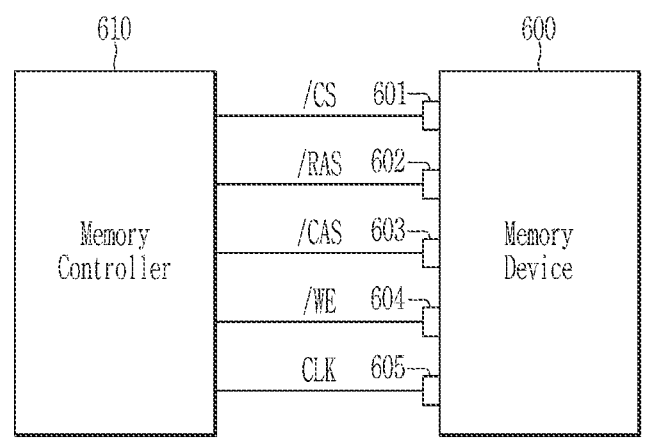
FIG. 7 is a diagram illustrating a plurality of pins of a memory device according to some embodiments.

FIG. 7 is a diagram illustrating a plurality of pins of a memory device according to some embodiments.

The memory device 600 illustrated in FIG. 7 is an example for explaining some embodiments, and only pins involved in command delimiters are illustrated in FIG. 7. In some embodiments, the memory device 600 may include a first pin 601, a second pin 602, a third pin 603, a fourth pin 604, and a fifth pin 605. In addition to the pins illustrated in FIG. 7, in some embodiments, the memory device 600 may further comprise a pin to which a clock enable signal CKE is input, a plurality of address pins to which addresses ADDR are input, a plurality of DQ pins to/from which data signals are input and output, and a power pin. However, the embodiment illustrated in FIG. 7 is only an example and, in some embodiments, additional pins to those discussed above may be provided.

In FIG. 7, the memory controller 610 may provide a chip select signal /CS to the first pin 601 of the memory device 600, provide a row address strobe command /RAS to the second pin 602 of the memory device 600, provide a column address strobe command /CAS to the third pin 603 of the memory device 600, and provide a write enable signal /WE to the fourth pin 604 of the memory device 600. A plurality of commands may be defined as combinations of logic levels of the signals provided to the first to fourth pins 601 to 604.

The memory controller 610 may provide a clock signal CLK for controlling an operating frequency of the memory device 600 to the fifth pin 605 of the memory device 600. The chip select signal /CS is a signal for selecting one of a plurality of memory chips constituting the semiconductor memory system, the row address strobe command /RAS is a signal for controlling a time point at which a row address is read from an address line, the column address strobe command /CAS is a signal for controlling a time point at which a column address is read from an address line, and the write enable signal /WE is a signal for controlling data writing.

In order to define a plurality of command delimiters for a plurality of offset commands, the memory controller 610 according to some embodiments may provide the chip select signal /CS of the first pin 601 in a double data rate (DDR) mode. When the chip select signal /CS is at a low level at a rising edge time point of the clock signal CLK, the memory device 600 may operate according to signals input through the other pins. In order to define a command delimiter for an offset command, the memory controller 610 may set a logic level of the chip select signal /CS for each specific edge of the clock signal CLK. For example, the memory controller 610 may implement a command delimiter for an offset command by setting the chip select signal /CS to a high level at a falling edge time point of the clock signal CLK.

Figure 8:
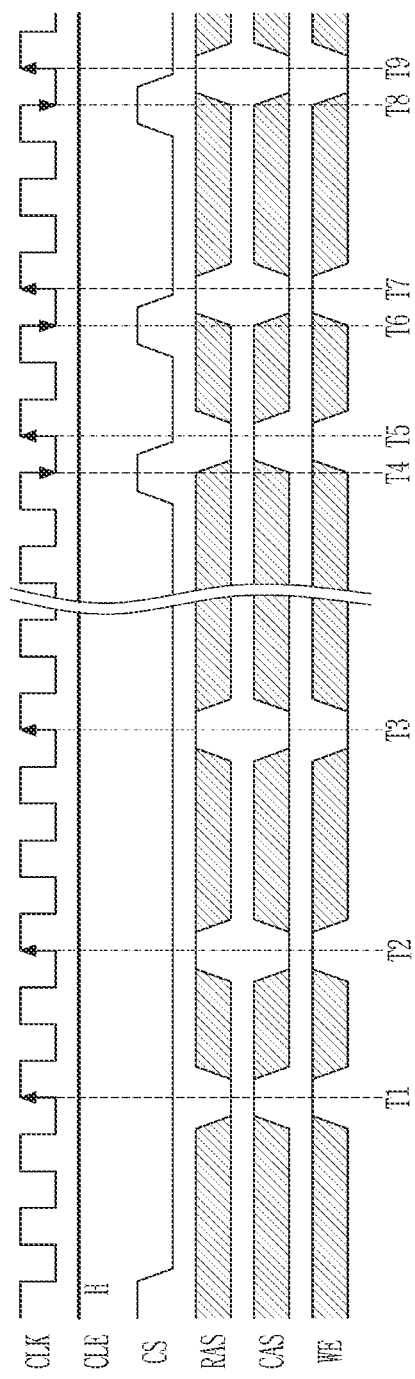
FIG. 8 is a waveform diagram illustrating command delimiters for variable offset-based commands according to some embodiments.

FIG. 8 is a waveform diagram illustrating command delimiters for variable offset-based commands according to some embodiments.

As illustrated in FIG. 8, each command indicating the same operation of the memory device has different command delimiters between a full address and an offset address.

A clock signal CLK, a chip select signal /CS, a row address strobe command /RAS, a column address strobe command /CAS, and a write enable signal /WE illustrated in FIG. 8 are generated by the memory controller 610, and are provided to the memory device 600 through the first pin 601 to the fifth pin 605. In FIG. 8, the memory controller 610 may provide a high-level clock enable signal /CKE to the memory device 600, such that the memory device 600 operates according to the clock signal CLK.

FIG. 8 is an example for explaining command delimiters for offset commands according to some embodiments, and the memory controller 610 may provide a chip select signal /CS to the memory device 600 in a DDR mode. That is, the first pin 601 may be driven in the DDR mode, the chip select signal /CS may have a specific value at a rising edge of the clock signal CLK.

In FIG. 8, signals indicating a bank address, a row address, a column address, whether to perform auto-precharge, and the like corresponding to the command CMD are omitted for conciseness. Signals to indicate information corresponding to the command CMD are not particularly limited and may be implemented by various methods.

At a rising edge T1 of the clock signal CLK, the chip select signal /CS, the row address strobe command /RAS, the column address strobe command /CAS, and the write enable signal /WE may have L, L, H, and H values, respectively, and a combination thereof may implement a command delimiter that indicates an activate operation of the full address. At a rising edge T2 of the clock signal CLK, the chip select signal /CS, the row address strobe command /RAS, the column address strobe command /CAS, and the write enable signal /WE may have L, H, L, and H values, respectively, and a combination thereof may implement a command delimiter that indicates a read operation of the full address. At a rising edge T3 of the clock signal CLK, the chip select signal /CS, the row address strobe command /RAS, the column address strobe command /CAS, and the write enable signal /WE may have L, H, L, and L values, respectively, and a combination thereof may implement a command delimiter that indicates a write operation of the full address.

The chip select signal /CS may have an H value at a falling edge T4 of the clock signal CLK, the row address strobe command /RAS, the column address strobe command /CAS, and the write enable signal /WE may have L, H, and H values, respectively, at a rising edge T5 of the clock signal CLK occurring following the falling edge T4, and a combination thereof (H, L, H, H) may implement a command delimiter that indicates an activate operation using a variable offset-based offset address. The chip select signal /CS may have an H value at a falling edge T6 of the clock signal CLK, the row address strobe command /RAS, the column address strobe command /CAS, and the write enable signal /WE may have H, L, and H values, respectively, at a rising edge T7 of the clock signal CLK occurring following the falling edge T6, and a combination thereof (H, H, L, H) may implement a command delimiter that indicates a read operation using a variable offset-based offset address. The chip select signal /CS may have an H value at a falling edge T8 of the clock signal CLK, the row address strobe command /RAS, the column address strobe command /CAS, and the write enable signal /WE may have H, L, and L values, respectively, at a rising edge T9 of the clock signal CLK occurring following the falling edge T8, and a combination thereof (H, H, L, L) may implement a command delimiter that indicates a write operation using a variable offset-based offset address.

Figure 9:
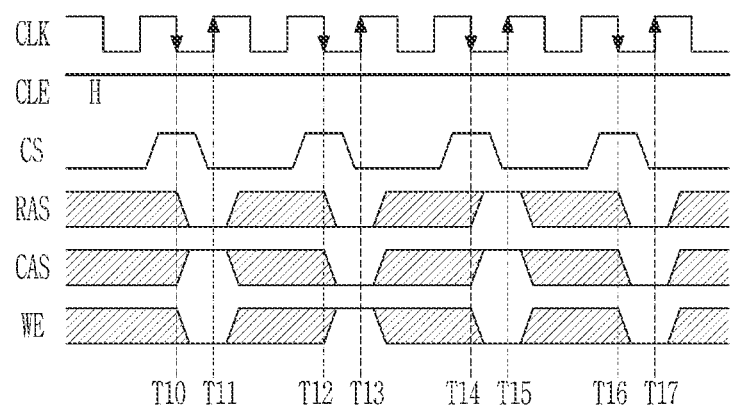
FIG. 9 is a waveform diagram illustrating command delimiters for fixed offset-based commands according to some embodiments.

FIG. 9 is a waveform diagram illustrating command delimiters for fixed offset-based commands according to some embodiments.

Waveforms of a chip select signal /CS, a row address strobe command /RAS, a column address strobe command /CAS, and a write enable signal /WE illustrated in FIG. 9 are examples and embodiments are not limited thereto.

The chip select signal /CS may have an H value at a falling edge T10 of the clock signal CLK, the row address strobe command /RAS, the column address strobe command /CAS, and the write enable signal /WE may have L, H, and L values, respectively, at a rising edge T11 of the clock signal CLK occurring following the falling edge T10, and a combination thereof (H, L, H, L) may implement a command delimiter that indicates an activate operation using a fixed offset-based offset address. The chip select signal /CS may have an H value at a falling edge T12 of the clock signal CLK, the row address strobe command /RAS, the column address strobe command /CAS, and the write enable signal /WE may have L, L, and H values, respectively, at a rising edge T13 of the clock signal CLK occurring following the falling edge T12, and a combination thereof (H, L, L, H) may implement a command delimiter that indicates a read operation using a fixed offset-based offset address. The chip select signal /CS may have an H value at a falling edge T14 of the clock signal CLK, the row address strobe command /RAS, the column address strobe command /CAS, and the write enable signal /WE may have H, H, and L values, respectively, at a rising edge T15 of the clock signal CLK occurring following the falling edge T14, and a combination thereof (H, H, H, L) may implement a command delimiter that indicates a write operation using a fixed offset-based offset address. The chip select signal /CS may have an H value at a falling edge T16 of the clock signal CLK, the row address strobe command /RAS, the column address strobe command /CAS, and the write enable signal /WE may have L, L, and L values, respectively, at a rising edge T17 of the clock signal CLK occurring following the falling edge T16, and a combination thereof (H, L, L, L) may implement a command delimiter that indicates a fixed offset value.

In order to reduce standby power proportional to an operating frequency of the memory device, a clock frequency for controlling the operating frequency of the memory device by separating the clock domain may be set to be lower than a frequency of a data signal DQ at a predetermined ratio. An increase of the predetermined ratio may cause a reduction in bandwidth of the command and address bus, resulting in a deterioration in performance. Since an offset address according to some embodiments is capable of reducing an amount of data transmitted through the command and address bus as compared with a conventionally used full address, it is possible to prevent a deterioration in performance resulting from a reduction in bandwidth. Furthermore, it is possible to provide a command for using an offset address, using existing pins, without adding an additional pin to the memory device. Even if an additional pin is implemented in the memory device instead of using the CS pin that receives a chip select signal /CS, since an amount of data transmitted to the memory device by the memory controller is reduced, the memory device can be driven with low power at the expense of reduced operating frequency.

Figure 10:
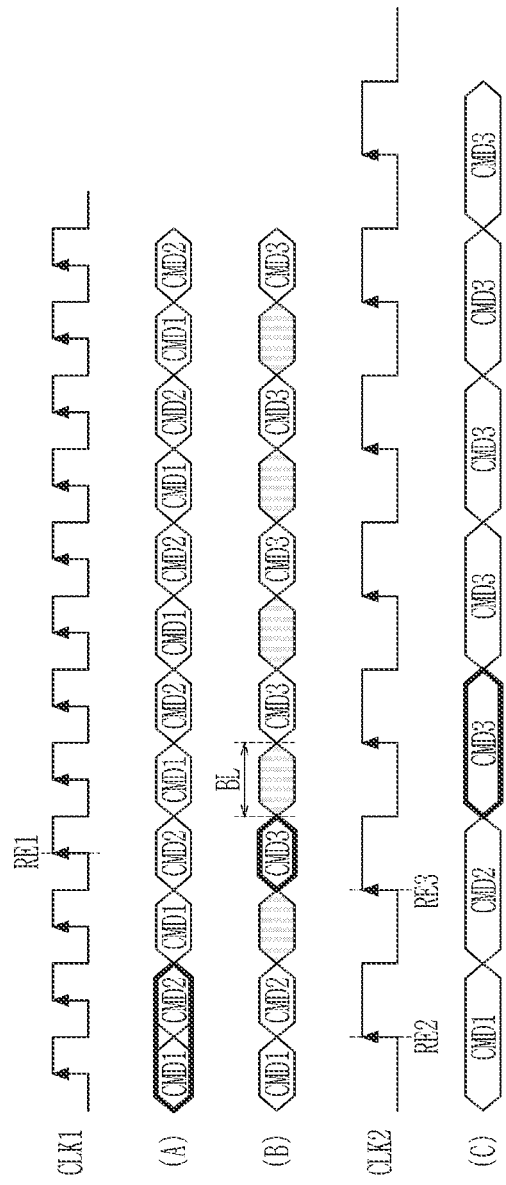
FIG. 10 is a waveform diagram illustrating a comparison of command transmission in an offset addressing mode with command transmission in a full addressing mode according to some embodiments.

FIG. 10 is a waveform diagram illustrating a comparison of command transmission in an offset addressing mode with that in a full addressing mode according to some embodiments.

Waveform (A) of FIG. 10 is a waveform diagram schematically illustrating a command for transmitting a full address in the full addressing mode.

Waveform (B) of FIG. 10 is a waveform diagram schematically illustrating a command for transmitting an offset address when an offset addressing mode is applicable.

Waveform (C) of FIG. 10 is a waveform diagram schematically illustrating command transmission when an operating frequency is 0.5 in comparison with (A) and (B). The waveforms illustrated in FIG. 10 are for command transmission, and a frequency at which the memory controller 120 transmits a data signal to the memory device 200 may be different from that at which the memory controller 120 transmits a clock signal CLK1 illustrated in FIG. 10 to the memory device 200. For example, the frequency at which the data signal is transmitted may be higher than that at which the clock signal CLK1 is transmitted.

When it is assumed that command 1 CMD1 and command 2 CMD2 are required to transmit a full address, in waveform (A) of FIG. 10, the command 1 CMD1 and the command 2 CMD2 need to be transmitted from the memory controller 120 to the memory device 200 at every rising edge of the clock signal CLK1.

When the memory device 200 is driven with the same clock signal CLK1, in waveform (B) of FIG. 10, the command 1 CMD1 and the command 2 CMD2 are required to transmit an initial full address. When the memory device 200 can be driven in the offset addressing mode, command 3 CMD 3 for transmitting an offset address may be transmitted to the memory device 200 at a rising edge (e.g., RE1) of the clock signal CLK1 every two cycles. That is, during a period between the command 3 CMD3 and next command 3 CMD3, there may be a section (BL) in which no command is transmitted. Then, the memory device 200 can be driven at ½ of a frequency of the clock signal CLK1, like a frequency of a clock signal CLK2 illustrated in FIG. 10.

In waveform (C) of FIG. 10, the command 1 CMD1 and the command 2 CMD2 for transmitting an initial full address may be transmitted at rising edges RE2 and RE3 of the clock signal CLK2, and the command 3 CMD3 for transmitting an offset address may be transmitted at every rising edge of the clock signal CLK2. In this way, the number of commands for transmitting an address can be reduced in the offset addressing mode, thereby lowering an operating frequency of the memory device, and accordingly, driving the memory device with low power.

Figure 11:
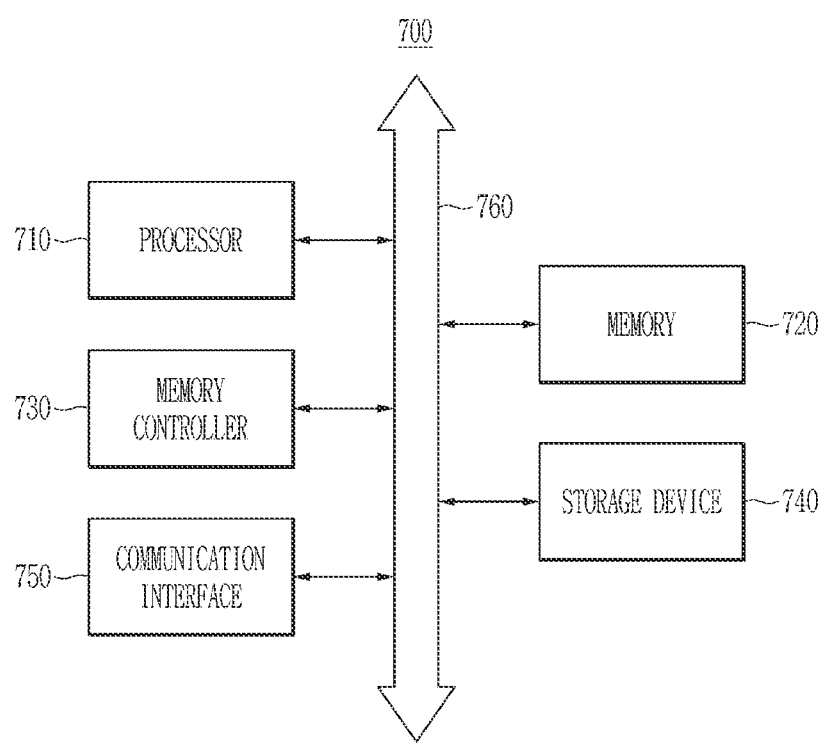
FIG. 11 is an exemplary block diagram illustrating a computing system according to some embodiments.

FIG. 11 is an exemplary block diagram illustrating a computing system according to some embodiments.

Referring to FIG. 11, a computing system 700 comprises a processor 710, a memory 720, a memory controller 730, a storage device 740, a communication interface 750, and a bus 760. In some embodiments, the computing system 700 may further comprise other components.

The processor 710 controls an overall operation of each component of the computing system 700. The processor 710 may be implemented by at least one of various processing units such as a central processing unit (CPU), an application processor (AP), and/or a graphic processing unit (GPU). In some embodiments, the memory controller 730 may be provided as a separate chip from the processor 710. In some embodiments, the memory controller 730 may be provided as an internal component of the processor 710.

The memory 720 may store various types of data and commands. The memory 720 may be implemented by the memory device 110 or the memory device 200 described with reference to FIGS. 1 to 10. The memory controller 730 controls transmission of data or commands to and from memory 720. The memory controller 730 may be implemented by the memory controller 120 described with reference to FIGS. 1 to 10. Accordingly, the memory controller 730 may generate commands in the offset addressing mode for a plurality of requests received from the processor 710 through the bus 760, transmit the commands to the memory 720, and store addresses requested in the offset addressing mode. The memory 720 may receive a command indicating an offset address, and generate a full address by adding the offset address to a previously stored last address in a corresponding bank according to the command.

The storage device 740 non-temporarily stores programs and data. In some embodiments, the storage device 740 may be implemented by a non-volatile memory. The communication interface 750 supports wired and wireless Internet communication of the computing system 700. In some embodiments, the communication interface 750 may support various communication methods other than the Internet communication. The bus 760 provides a function enabling communication between the components of the computing system 700. The bus 760 may comprise at least one type of bus according to a communication protocol between the components.

In some exemplary embodiments, each component or a combination of two or more components described with reference to FIGS. 1 to 11 may be implemented by a digital circuit, a programmable or non-programmable logic device or array, an application specific integrated circuit (ASIC), and the like.

While various practical exemplary embodiments have been described in connection with the drawings, it is to be understood that embodiments are not limited to the disclosed embodiments. On the contrary, the present disclosure is intended to cover various modifications and equivalent arrangements comprised within the spirit and scope of the appended claims.

What is claimed is:

1. A semiconductor memory system comprising:
a memory device comprising a plurality of banks; and
a memory controller configured to generate an offset address for a first bank among the plurality of banks and a command indicating the offset address, based on a first request, and transmit the offset address and the command to the memory device,
wherein the memory device is configured to receive the offset address and the command, generate a first address by adding the offset address to a base address for the first bank, according to the command, and perform a memory operation on the first address of the first bank according to the command.

2. A semiconductor memory system comprising:
a memory device comprising a plurality of banks; and
a memory controller configured to generate an offset address for a first bank among the plurality of banks and a command indicating the offset address, based on a first request,
wherein:
the memory device is configured to generate a first address by adding the offset address to a base address for the first bank, according to the command, and perform a memory operation on the first address of the first bank according to the command,
when an address in the first bank that corresponds to the first request is within an offset range with respect to a second address in the first bank that corresponds to a second request immediately before the first request, the memory controller generates the offset address for the first bank with respect to the second address, and
the base address is the second address.

3. The semiconductor memory system of claim 2, wherein:
the command comprises at least one of:
an Offset-Activate command indicating an activate operation using the offset address, the Offset-Activate command comprising a command delimiter, a bank address, and an offset;
an Offset-Read command indicating a read operation using the offset address, the Offset-Read command comprising a command delimiter, a bank address, and an offset; and
an Offset-Write command indicating a write operation using the offset address, the Offset-Write command comprising a command delimiter, a bank address, and an offset.

4. The semiconductor memory system of claim 3, wherein:
the command comprises the Offset-Activate command, the Offset-Read command, and the Offset-Write command,
the offset of the Offset-Activate command is an offset row address, and
the offset of each of the Offset-Read command and the Offset-Write command is an offset column address.

5. The semiconductor memory system of claim 2, wherein:
the command comprises at least one of:
an Offset-Activate command indicating an activate operation using the offset address, the Offset-Activate command comprising a command delimiter and a bank address;
an Offset-Read command indicating a read operation using the offset address, the Offset-Read command comprising a command delimiter and a bank address;
an Offset-Write command indicating a write operation using the offset address, the Offset-Write command comprising a command delimiter and a bank address; and
a Set-Offset command comprising a command delimiter, a bank address, and an offset.

6. The semiconductor memory system of claim 5, wherein:
the command comprises the Set-Offset command, and
the offset of the Set-Offset command has a fixed value corresponding to the offset address.

7. The semiconductor memory system of claim 2, wherein:
the memory device comprises an address decoder configured to identify the offset address for the first bank by decoding the command, and generate the first address by adding the offset address to the second address.

8. The semiconductor memory system of claim 7, wherein the address decoder comprises:
an address table that stores, for each of the plurality of banks, a base row address for a memory row that was driven last for the first bank and a base column address for a memory column that was driven last for the bank;
a row/column selector configured to provide one of a base row address and a base column address in the address table that corresponds to the first bank; and
an address summer configured to generate the first address by adding the offset address to the one of the base row address and the base column address provided from the row/column selector.

9. The semiconductor memory system of claim 8, wherein when the command indicates an offset row address, the row/column selector provides the base row address to the address summer, and the address summer generates the first address by adding the offset address to the base row address.

10. The semiconductor memory system of claim 8, wherein:
when the command indicates an offset column address, the row/column selector provides the base column address to the address summer, and the address summer generates the first address by adding the offset address to the base column address.

11. The semiconductor memory system of claim 8, wherein:
the address decoder further comprises an address demultiplexer configured to update the first address in the address table with the one of a base row address and a base column address corresponding to the first bank.

12. The semiconductor memory system of claim 8, wherein:
the address decoder further comprises an address multiplexer configured to output the first address provided from the address summer when the first address is within the offset range, and output the first address provided from the memory controller when the first address is not within the offset range.

13. The semiconductor memory system of claim 1, wherein:
the command indicates the memory operation and the memory operation corresponds to the offset address, and
the command comprises a plurality of signals comprising a chip select signal provided to the memory device in a double data rate mode.

14. An address decoding method comprising:
receiving, from a memory controller, a command and an address;
decoding the command;
when the command indicates the address comprises an offset row address, generating a row address by adding the offset row address to a base row address for a memory row that was driven last in a bank corresponding to the address; and
when the command indicates the address comprises an offset column address, generating a column address by adding the offset column address to a base column address for a memory column that was driven last in a bank corresponding to the address.

15. The address decoding method of claim 14, wherein an address table stores, for each bank of a plurality of banks, a base row address for a memory row of the bank that was driven last and a base column address for a memory column that was driven last, and
the address decoding method further comprises updating the address table with the row address or the column address of the bank that was generated.

16. The semiconductor memory system of claim 1, wherein the offset address comprises an address having a smaller number of bits than a full address.

17. The address decoding method of claim 14, wherein the offset address comprises an address having a smaller number of bits than a full address.

* * * * *